United States Patent
Shimotsu et al.

(10) Patent No.: US 6,554,333 B2
(45) Date of Patent: Apr. 29, 2003

(54) VEHICLE BUMPER ASSEMBLY

(75) Inventors: Koji Shimotsu, Soja (JP); Hiroshi Yoshida, Soja (JP)

(73) Assignee: OM Corporation, Okayama (JP)

(*) Notice: Subject to any disclaimer, the term of this patent is extended or adjusted under 35 U.S.C. 154(b) by 0 days.

(21) Appl. No.: 10/137,527

(22) Filed: May 2, 2002

(65) Prior Publication Data

US 2002/0167183 A1 Nov. 14, 2002

(30) Foreign Application Priority Data

May 10, 2001 (JP) ........................................ 2001-139684

(51) Int. Cl.[7] .............................................. B60R 19/34
(52) U.S. Cl. ........................ 293/132; 293/133; 293/155; 296/188; 296/189
(58) Field of Search .................. 293/102, 132, 293/133, 155, 154; 296/29, 188, 189

(56) References Cited

U.S. PATENT DOCUMENTS

| | | | | |
|---|---|---|---|---|
| 3,146,014 A | * | 8/1964 | Kroell | 293/133 |
| 3,511,345 A | * | 5/1970 | Takamatsu et al. | 293/133 |
| 3,599,757 A | * | 8/1971 | Takamatsu et al. | 293/133 |
| 3,998,485 A | * | 12/1976 | Putter et al. | 293/133 |
| 4,023,652 A | * | 5/1977 | Torke | 293/133 |
| 4,257,581 A | * | 3/1981 | Keeler, II | 293/133 |
| 4,509,781 A | * | 4/1985 | Dick et al. | 293/155 |
| 4,829,979 A | * | 5/1989 | Moir | 293/132 |
| 4,830,417 A | * | 5/1989 | Bates et al. | 293/132 |
| 4,913,268 A | * | 4/1990 | Parker et al. | 293/155 |
| 4,995,660 A | * | 2/1991 | Horansky et al. | 293/132 |
| 5,005,887 A | * | 4/1991 | Kelman | 293/155 |
| 5,273,330 A | * | 12/1993 | Petry et al. | 293/132 |
| 5,314,229 A | * | 5/1994 | Matuzawa et al. | 293/133 |
| 5,403,049 A | * | 4/1995 | Ebbinghaus | 293/133 |
| 5,566,777 A | * | 10/1996 | Trommer et al. | 293/155 |
| 5,732,801 A | * | 3/1998 | Gertz | 293/133 |
| 6,027,105 A | * | 2/2000 | Dohrmann et al. | 293/133 |
| 6,042,163 A | * | 3/2000 | Reiffer | 293/155 |
| 6,174,009 B1 | | 1/2001 | McKeon | |
| 6,231,095 B1 | | 5/2001 | Chou et al. | |
| 6,293,587 B1 | * | 9/2001 | Lapic et al. | 293/133 |

FOREIGN PATENT DOCUMENTS

| | | |
|---|---|---|
| DE | 100 02 148 A1 | 7/2001 |
| EP | 1 114 753 A2 | 7/2001 |

* cited by examiner

Primary Examiner—Stephen T. Gordon
Assistant Examiner—Greg Blankenship
(74) Attorney, Agent, or Firm—Koda & Androlia (57) ABSTRACT

A vehicle bumper assembly characterized by high connection strength with reliable impact absorption, wherein a support bracket is in the form of multi-step structure, a small tube portion of one end of the support bracket is provided with a bumper connection member connected to a bumper and a large tube portion of the other end of the support bracket is provided with a vehicle body connection member attachable to and detachable from a vehicle body member, the bumper connection member is installed to one end or one end portion of the bumper, a connection hole is provided on the bumper connection member for inserting the small tube portion, and the bumper and the support bracket is connected by inserting the small tube portion into the connection hole and by welding the side surface of the small tube portion at a cylindrical wall of the peripheral edge of the connection hole.

3 Claims, 6 Drawing Sheets

VEHICLE BUMPER ASSEMBLY

BACKGROUND OF THE INVENTION

1. Field of the Invention

The present invention relates to a vehicle bumper assembly to be connected to a vehicle body member via a support bracket attached to a bumper.

2. Prior Art

Vehicle bumper assemblies that are connected to a vehicle body member via a support bracket attached to a bumper are common. Examples of this kind of bumper are shown in U.S. Pat. Nos. 3,511,345B1, 4,995,660B1, 6,174,009B1, 6,231,095B1, EP1114753A2, DE10002148A1, etc.

U.S. Pat. No. 3,511,345B1 discloses a vehicle bumper assembly comprising a bumper connected to a vehicle body member via a tubular support bracket having two or more axially aligned tubes of different diameters that bring about impact absorption.

U.S. Pat. No. 4,995,660B1 discloses a vehicle bumper assembly using a cylinder as a support bracket to bring about impact absorption.

U.S. Pat. No. 6,174,009B1 discloses a vehicle bumper assembly connecting a tower to be crushed by joining a support bracket and a bumper using a swivel connection.

U.S. Pat. No. 6,231,095B1 discloses a vehicle bumper assembly having a bumper connected to a vehicle body member using a support bracket with one split end of a tube flared and welded to a vehicle body frame.

EP1114753A2 discloses a vehicle bumper assembly having a bumper connected to a vehicle body member using a support bracket provided with a large number of depressions on the surface of a tube carrying out impact absorption.

DE10002148A1 discloses a vehicle bumper assembly having a bumper connected to a vehicle body member using a support bracket utilizing an extension of a spring, that is normally folded.

Although prior vehicle bumper assemblies have the same characteristic feature that a support bracket has the ability to absorb impacts, the support members that bring about such impact absorption have a wide variety of configurations. This is due to the fact that (1) a superior ability to absorb impacts, (2) a strong connection between a bumper, a support bracket and a vehicle body member, and (3) reliable impact absorption (reliability) are demanded of a vehicle bumper assembly. In addition, since attachment space for a support bracket is limited, (4) space-saving and (5) a simple configuration are also demanded. Therefore, investigations have been carried out in order to develop a vehicle bumper assembly using a support bracket meeting the requirements in (1) to (5) above in a balanced manner and having the ability to absorb impacts by utilizing plastic deformation.

SUMMARY OF THE INVENTION

A vehicle bumper assembly comprises: a bumper; a bumper connection member attached to the bumper; a support bracket attached to the bumper via the bumper connection member, the support bracket being in the form of a molded multi-step tubular structure having a plurality of plastically deformable straight tube portions of different outer diameters contiguous to one another, the tube portions being formed by reducing and enlarging an initially-uniform-diameter blank tube radially at longitudinally spaced local positions; and a vehicle body member connected to the support bracket via a vehicle body connection member; wherein one end tube portion of the support bracket being connected to the bumper via the bumper connection member, and the other end tube portion of the support bracket being connected to the vehicle body member via the vehicle body connection member; the bumper connection member being installed to one end or one end portion of the bumper by utilizing bolts or rivets or welding; the bumper connection member having a connection hole on the surface thereof opening toward the direction to the vehicle body member; and the one end tube portion of the support bracket being inserted into the connection hole of the bumper connection member and having a side surface welded to a peripheral edge of the connection hole.

The bumper has at the position toward the one end and in a surface facing the vehicle body member a cutaway, and said bumper connection member is attached to said cutaway of the bumper. In this case, only the rear surface of the bumper or large portion of the end portion of the bumper including the rear surface may be cut away. The case of the entire end portion of the bumper being cut away is when the bumper connection member is attached to a bumper with both ends pre-cut so as to be rectangular. The tube portion at one end of the support bracket connected to the bumper is configured so that the periphery of one end of the tube portion is pressed against the inner side of the front surface of the bumper connection member, and an impact received by the bumper is made to travel in the direction of the contiguous tube portions of the support bracket via the bumper connection member. In this way, the present invention is characterized by individual connection members connecting the support bracket, fulfilling the plastic deformation requirements of (1), and the requirements (4) and (5) due to being a single unit, to the bumper and the vehicle body member in a simple and secure manner.

When a tube portion at a small outer diameter (hereinafter referred to as a small tube portion) sinks into a tube portion with a large outer diameter (hereinafter referred to as a large tube portion) by a collosion, plastic deformation is caused in the area of the support bracket used in the present invention between a step of both tube portions and the large tube portion. Individual connection members attached to the front and back of the support bracket therefore do not interfere with plastic deformation of the support bracket. When the tube constituting the support bracket has a three step structure, although a sequence of a large tube portion—a small tube portion—a large tube portion (the diameters of the first and the last large tube portions may be different) or a small tube portion—a large tube portion—a small tube portion (the diameters of the first and the last small tube portions may be different) can be considered, a multi-step structure having contiguous tube portions according to a size of outer diameters (namely a small tube portion—a middle tube portion—a large tube portion) is preferable. In this case, it is preferable to have a relationship where the outer diameter of the small tube portion is narrower than the inner diameter of the middle tube portion, and the outer diameter of the middle tube portion is narrower than the inner diameter of the large tube portion.

The bumper connection member is preferably configured to provide a cylindrical wall so as to project from a peripheral edge of the connection hole contacting the side surface of the tube portion, and to weld the peripheral edge of the cylindrical wall and the side surface of the tube portion. The cylindrical wall can be provided together with the connection hole using a burring process. Welding using the cylindrical wall makes the welding operation straightforward and suppresses detachment of the welded joint portion of the support bracket starting plastic deformation and the bumper connection member so as to fulfill requirements (2) and (3). The projecting direction of the cylindrical wall maybe backward or forward, however, a direction where an impact is applied, or a direction facing the vehicle body member (backward) is usually preferable. The connection hole is configured so that the periphery of one end of the tube is pressed against the inner side of the front surface of the bumper, and an impact received by the bumper is made to directly travel in the direction of the contiguous tube portions of the support bracket.

The vehicle body connection member is preferably formed by causing an annular ridge to abut against the end periphery of the tube of the support member end and welding, and the annular ridge has an opening, as a crumple containment hole, having a support surface, enclosed by an outer periphery that is wider than the outer diameter of the tube at the support member end and an inner periphery that is narrower than the inner diameter of a tube connected to the tube at the support member end, and the support surface inner side. This vehicle body connection member assures stable plastic deformation of the support bracket when applied to a three- or more-step support brackets. For example, "an one-end tube portion at one end of the support bracket" will be the large tube portion, and "a tube portion contiguous to this one-end tube portion" will be the middle tube portion when the support bracket is a three-step structure of the small tube portion—the middle tube portion—the large tube portion. In addition, the size of the deformed-tube receiving hole is defined from the range where the outer diameter of the small tube portion<the diameter of the deformed-tube receiving hole<the inner diameter of the middle tube portion (=the diameter of the inner periphery of the annular ridge), considering the plastic deformation portion starting from the step so as to allow a small tube portion to sink in.

The support surface that the annular ridge has supports the approaching step between the large tube portion and the middle tube portion caused by plastic deformation due to impact absorption, so that plastic deformation does not occur at the peripheral edge of the large tube portion. As a result, detachment of the peripheral edge of the large tube portion can be prevented when the support bracket is absorbing an impact, which fulfils the requirements (2) and (3). The small tube portion can be sank through the inside of the annular ridge due to plastic deformation since the deformed tube receiving hole is opened inside of the inner periphery of the support surface. This movement makes the plastic deformation range larger, and therefore fulfills requirement (1).

DETAILED DESCRIPTION OF THE INVENTION

Embodiments of the present invention will now be described in the following.

Figure 1:
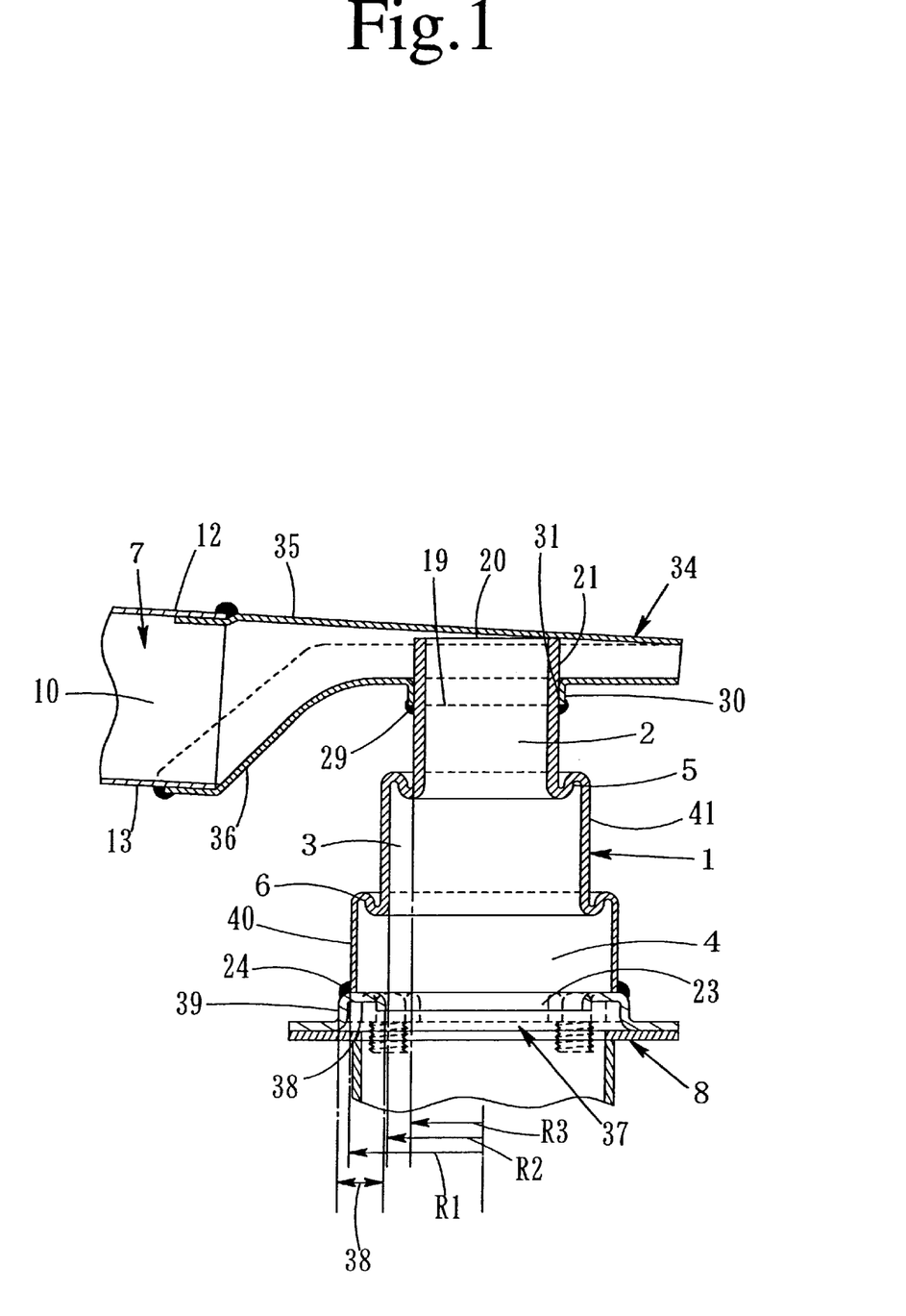
FIG. 1 is a cross-sectional view showing an example of a vehicle bumper assembly to which the present invention is applied.

A support bracket 1 has the same structure in each example shown. The support bracket 1, as can be seen in FIG. 1, is a three-step structure created by compressing the diameter of one end portion of a plastically deformable straight metal tube and expanding the diameter of the other end portion of the tube so as to form a small tube portion 2, a middle tube portion 3, and a large tube portion 4 with different outer diameters, contiguous to one another via steps 5 and 6 between individual tube portions. Namely, the support bracket 1 has the middle tube portion 3 which only has the original thickness, and the small tube portion 2 with a compressed diameter which is thicker compared to the middle tube portion 3. On the other hand, the large tube portion 4 with an expanded diameter is thinner than the middle tube portion 3. The individual steps 5 and 6 make it easy for plastic deformation to start at the time of impact due to having a cross-sectional structure of folded contiguous tube portions. In this example, the small tube portion 2 of the support bracket 1 faces towards a bumper 7 side, and the large tube portion 4 faces towards a vehicle body member 8 side.

Figure 2:
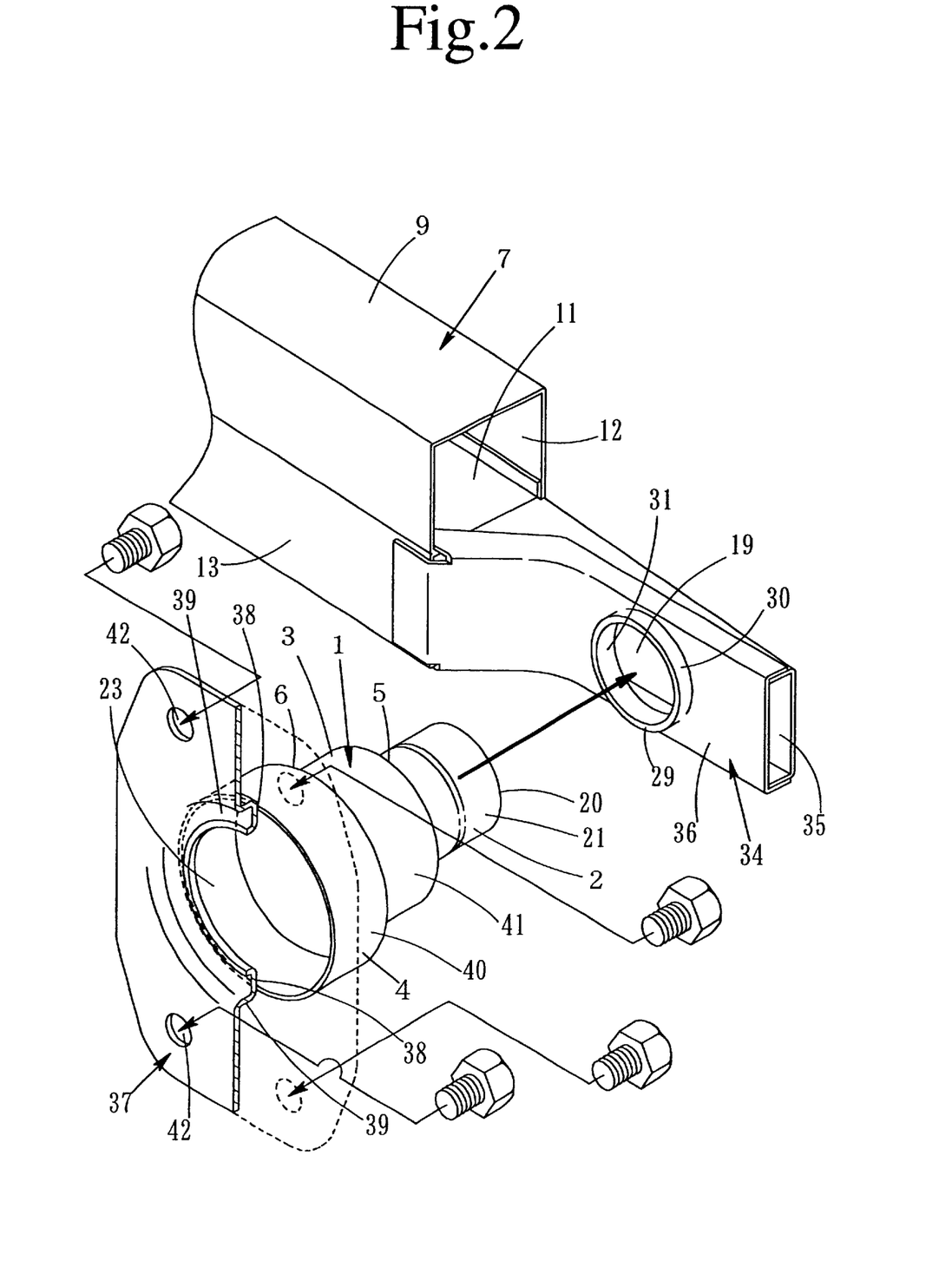
FIG. 2 is a perspective view corresponding to FIG. 1, viewed from a rear surface direction, showing the relationship of the vehicle bumper assembly.

The bumper 7 of this example, as in FIG. 1 and FIG. 2, has a substantially square section formed by rolling a sheet of plate, and a reinforcement rib 11 parallel to a bumper upper surface 9 and a bumper lower surface 10 are provided across a bumper front surface 12 and a bumper rear surface 13 in the middle in a vertical direction. A bumper connection member 34 attached to the small tube portion 2 of the support bracket 1 is attached to an end portion of the bumper 7. This bumper connection member 34 is configured by fitting a front surface side cover 35 and a rear surface side cover 36. A connection hole 19 enclosed by a cylindrical wall 30 provided so as to project towards the vehicle body member 8 is provided on the rear surface side cover 36, and the small tube portion 2 is inserted into the connection hole 19 so as to weld a cylindrical wall peripheral edge 29 and a small tube portion side surface 21. The cylindrical wall 30 prevents detachment of a connection between the bumper connection member 34 and the support bracket 1 under the impact of low loads (detachment of welded portions in the example). As a result, the bumper front surface 12 and the bumper rear surface 13 of the bumper 7 push the front surface side cover 35 and the rear surface side cover 36 respectively so as to transmit the impact to the support bracket 1 (refer to FIG. 3 described later).

The large tube portion 4 is welded to a vehicle body connection member 37, and this vehicle body connection member 37 is bolted onto the vehicle body member 8 via bolt holes 42 so that the large tube portion 4 is indirectly connected to the vehicle body member 8, so as to connect a large tube portion peripheral edge 24 to the vehicle body member 8 in an indirect manner. In this way, if the bumper 7 or the support bracket 1 is damaged, the vehicle body connection member 37 is removed from the vehicle body member in order to change the bumper 7, the bumper connection member 34, the support bracket 1 and the vehicle body connection member 37 as a single unit. The vehicle body connection member 37 of this example is provided with an annular ridge 39 having a circular support surface 38 enclosing a deformed tube-receiving hole 23. The annular ridge 39 functions as a reinforcement rib of the vehicle body connection member 37. The outer diameter of the support surface 38 is wider than an outer diameter R1 of the large tube portion to be welded and the inner diameter of the support surface 38 is narrower than an inner diameter R2 of the middle tube portion, and the diameter of the deformed-tube receiving hole 23 inside of the support surface 38 is wider than an outer diameter R3 of the small tube portion. At the time of plastic deformation due to an impact, in the support bracket 1, the plastic deformation is restrained by abutting the step between the middle tube portion and the large tube portion against the support surface 38. However, the step 5 between the small tube portion and the middle tube portion goes into the deformed-tube receiving hole 23 inside the support surface 38, and the small tube portion 2 sinks into the deformed-tube receiving hole 23. In this manner, when the deformed-tube receiving hole 23 in which the small tube portion 2 sinks is provided in the vehicle body member 8, space-saving can be achieved by limiting the space the support bracket 1 occupies, and at the same time, the space allowing for plastic deformation can be fully secured.

Figure 3:
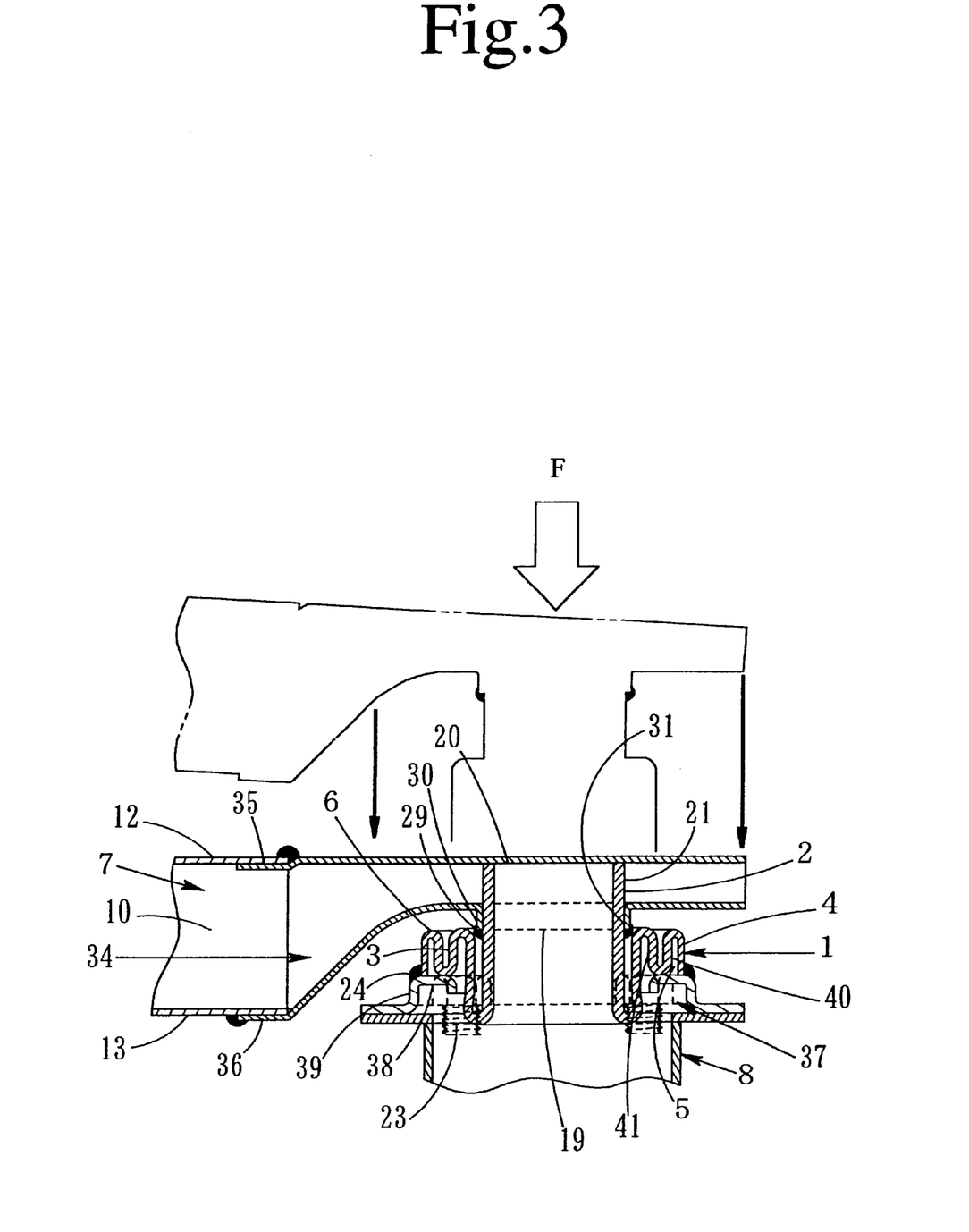
FIG. 3 is a cross sectional view corresponding to FIG. 1 showing a state of impact absorption at the vehicle bumper assembly described in FIG. 1.

In the example of FIG. 3, when an impact F is added from the bumper front surface 12 to the bumper rear surface 13, the bumper 7 is pushed down relatively backward while being partially deformed or damaged. For example, even if the joint portion between the bumper 7 and the bumper connection member 34 is deformed, since the bumper front surface 12 presses the front surface side cover 35 of the bumper connection member 34 and the bumper rear surface 13 presses the rear surface side cover 36, adherence of the bumper connection member 34 to the bumper 7 is not interfered with. The bumper connection member 34 is pushed along a small tube portion side surface 21 connected to the cylindrical wall peripheral edge 29 and the inner surface of the front surface side cover 35 pushes a small tube portion peripheral edge 20 and transmits the impact F to the support bracket 1. The support bracket 1 absorbs this impact F as a result of a folding movement (plastic deformation) of the side surfaces of the tube portions that follows the steps 5 and 6. The plastic deformation does not occur in an entirely equal manner. In other words, in fact, the plastic deformation occurs in order that the step 6 between the middle tube portion and the large tube portion is at first stretched in to plastically deform, and the middle tube portion 3 folds in a large tube portion side surface 40 contiguous to the step 6 to push in towards the deformed-tube receiving hole 23 due to the relationship between the thickness of individual tube portions.

However, when the step 6 between the middle tube portion and the large tube portion is pressed against the support surface 38, subsequent plastic deformation of the large tube portion side surface 40 is suppressed. As a result, plastic deformation is prevented from being propagated to the pressed portion of the large tube portion peripheral edge 24 against the support surface 38, and does not cause the welded joint portion to become detached. Subsequently, in order to absorb the remaining impact F, the step 5 between the small tube portion and the middle tube portion is then stretched in so as to plastically deform, and the small tube portion 2 are pushed into the deformed-tube receiving hole 23 while folding a middle tube portion side surface 41 contiguous to the step 5. This plastic deformation requires a force greater than that for plastic deformation capable of folding the large tube portion side surface 40 due to the relationship of thickness of the tubes, and the impact F can therefore be absorbed much more effectively.

For example, when the small tube portion 2 inclines towards the middle tube portion 3 (individual axes of the tube portions are out of alignment), the structure for supporting the step 6 between the middle tube portion and the large tube portion with the support surface 38 of the annular ridge 39 suppresses the inclination of the middle tube portion 3 accompanied by the inclination of the small tube portion 2, assuring only the sinking of the small tube portion 2. This is due to the fact that the step 6 between the middle tube portion and the large tube portion is pressed against the support surface 38, which is capable of preventing the inclination of the middle tube portion 3 following the small tube portion 2 even if the small tube portion 2 inclines. In this manner, the annular ridge 39 prevents the separation of connection (detachment of the welded portion in this example) between the large tube portion peripheral edge 24 and vehicle body connection member 37 by controlling the sinking of the middle tube portion 3 into the deformed-tube receiving hole, and assures that the small tube portion 2 is sank into the deformed-tube receiving hole 23, which absorbs the impact.

In the support bracket 1 of a multi-step structure having contiguous tube portions, the tube portions 2, 3, and 4 plastically deform individually or integrally so that an impact can be effectively absorbed within a short distance. Namely, this plastic deformation is a deformation for folding in the entire length of the support bracket 1 at the same time as the number of the steps. This type of plastic deformation fully absorbs the necessary impact as long as the actual deformation occurs toward the designed direction of deformation. However, prior vehicle bumper assemblies utilizing a plastic deformation have a complicated structure for determining the deformation direction, and a large volume of plastic deformation can therefore be wasted. The present invention obtains both balanced results of determination of a deformation direction and plastic deformation volume achieved by connection on the bumper 7 side using the cylindrical wall 30 and connection on the vehicle body member 8 side using the annular ridge 39. In addition, the present invention provides an impact absorption structure without connection separation, namely, a highly reliable impact absorption structure.

Figure 4:
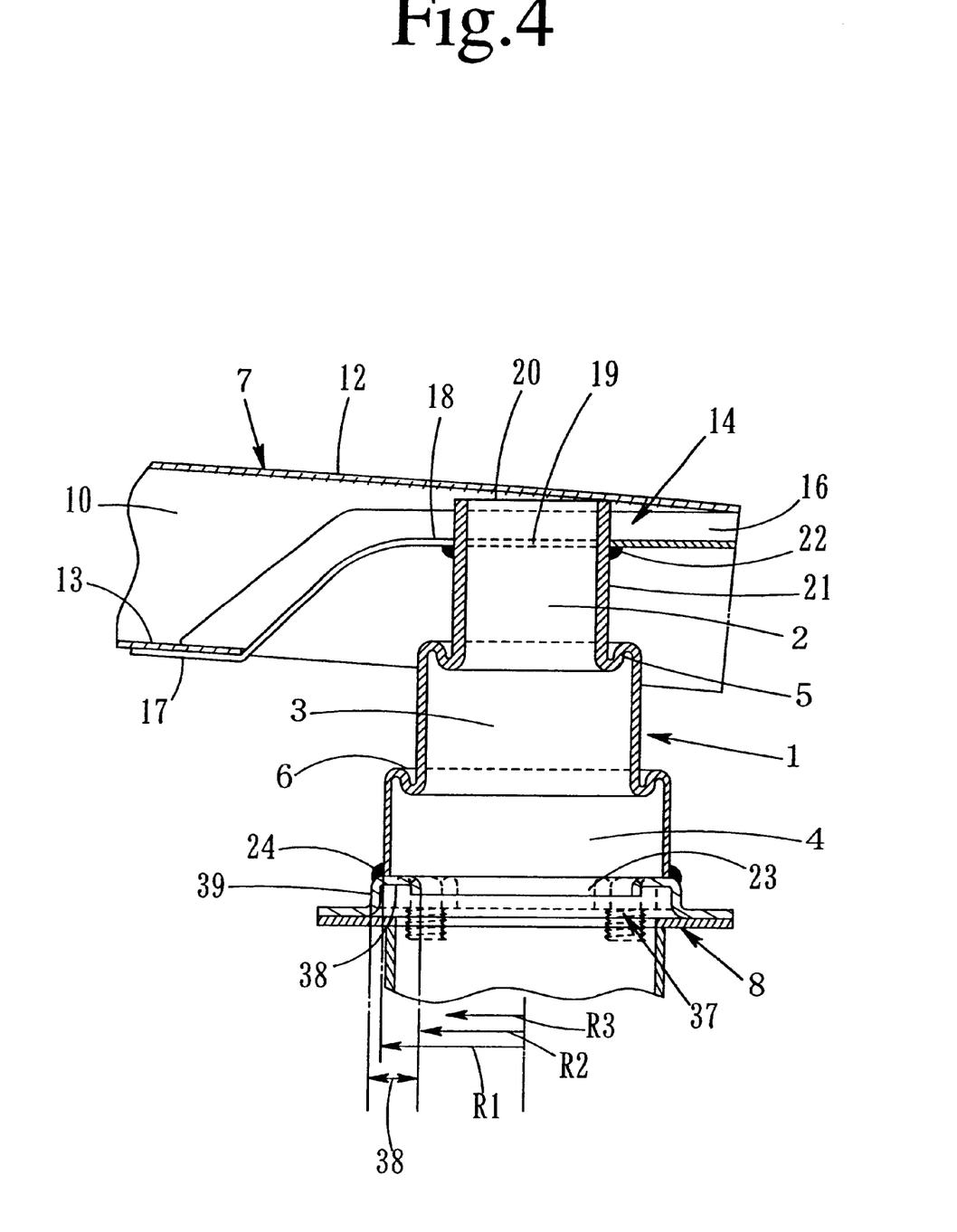
FIG. 4 is a cross-sectional view showing an another example of a vehicle bumper assembly to which the present invention is applied.
Figure 5:
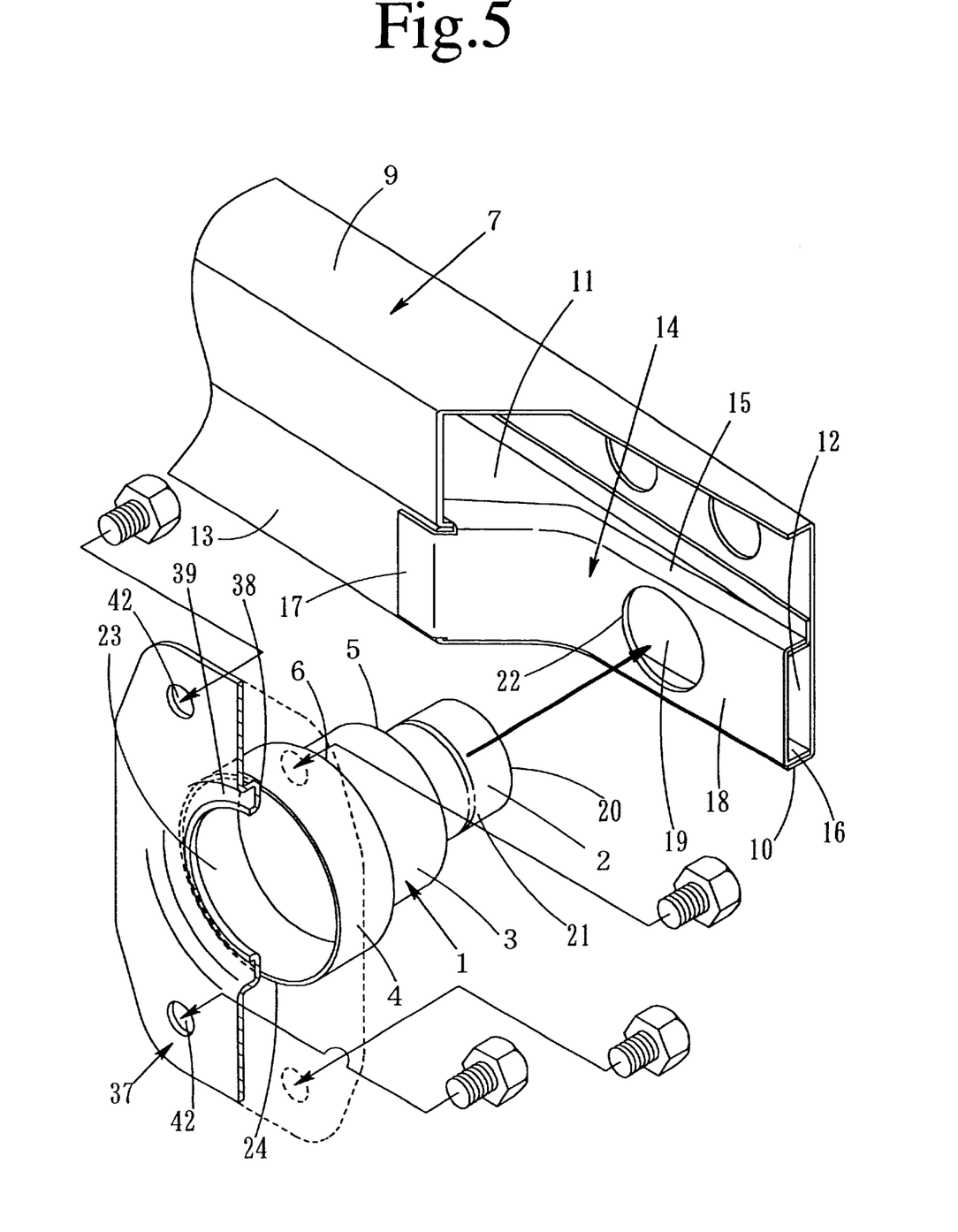
FIG. 5 is a perspective view corresponding to FIG. 4, viewed from a rear surface direction, showing the relationship of the vehicle bumper assembly.

In an example shown in FIG. 4 and FIG. 5, the bumper rear surface 13 is cut away at a position toward the one end of the bumper 7, the bumper upper surface 9 and the bumper lower surface 10 are partially diagonally cut away with the exception of a portion next to the bumper front surface 12, and this portion cut away is covered with a bumper connection member 14 provided in order to attach the support bracket 1. The bumper connection member 14 has an upper and a lower horizontal flanges 15 and 16 touching each from above to the reinforcement rib 11 and the bumper lower surface 10 of the bumper 7 respectively, and a vertical flange 17 provided at the outside of the bumper rear surface 13. This bumper connection member 14 is attached by bolting, riveting or welding the flanges 15, 16, and 17 to the bumper 7. This bumper connection member 14 is provided with a connection hole 19 for inserting the small tube portion 2 on a connection surface 18.

In the support bracket 1, the small tube portion 2 is inserted from the connection hole 19 opened on the connection surface 18 of the bumper connection member 14, the small tube portion peripheral edge 20 is pressed against the inner side of the bumper front surface 12 of the bumper 7, and the small tube portion side surface 21 is welded at a connection hole peripheral edge 22 (The one dot line on the small tube portion side surface 21 in FIG. 5 shows the welded portion). Although the small tube portion peripheral edge 20 does not have to make close contact with the inner side of the bumper front surface 12, it is still preferably as close to the inner side of the bumper front surface 12 as possible. The closer the small tube portion peripheral edge 20 is towards the inner side of the bumper front surface 12, the sooner the support bracket 1 can start plastically deforming directly after an impact is applied to the bumper 7, so as to give minimum deformation under low loads. The large tube portion 4 is connected to the vehicle body member 8 via the vehicle body connection member 37 as shown in the same example above.

Figure 6:
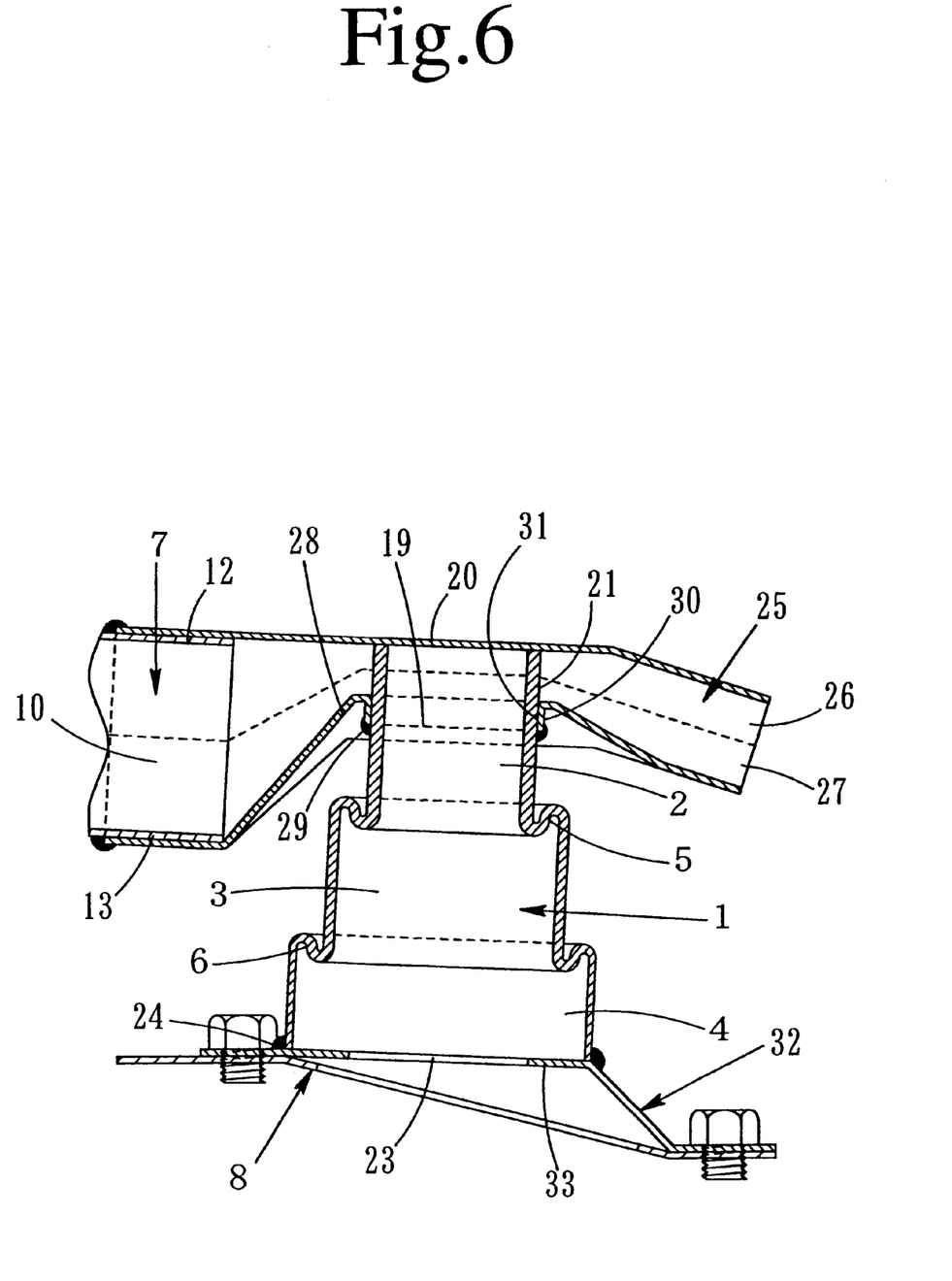
FIG. 6 is a cross-sectional view showing a further example of the vehicle bumper assembly.

In an example shown in FIG. 6, the support bracket 1 is connected to the bumper connection member 25 attached to the end portion of the bumper 7. This bumper connection member 25 is a hollow member configured by fitting a front surface side cover 26 and a rear surface side cover 27. The bumper connection member 25 sandwiches the outer sides of the bumper front surface 12 and the bumper rear surface 13 of the bumper 7 with end surfaces of individual covers 26 and 27 and is welded so as to be integrally formed with the bumper 7. The support bracket 1 is connected to the bumper 7 by inserting the small tube portion 2 into the connection hole 19 provided on a depressed surface 28 of a curved rear surface side cover 27, and welding the small tube portion side surface 21 at the cylindrical wall peripheral edge 29 while the small tube portion peripheral edge 20 is pressed against the inner surface of the front surface side cover 26.

The bumper connection member 25 encloses the connection hole 19 provided on the depressed surface 28 of the rear surface side cover 27, and the cylindrical wall 30 projecting towards the vehicle body member 8 is provided using a burring process. In the small tube portion 2, the small tube portion side surface 21 makes contact with a cylindrical wall inner surface 31, and the cylindrical wall peripheral edge 29 is welded at the small tube portion side surface 21. The operation of welding the cylindrical wall peripheral edge 29 and the small tube portion side surface 21 is therefore straightforward. The small tube portion 2 is pulled and sank into the middle tube portion 3 and the large tube portion 4 as a result of welding with the cylindrical wall 30 according to the bumper connection member 25 integrally moving backwards with the bumper 7, rather than being pushed towards the inside of the bumper front surface 12. Since the cylindrical wall inner surface 31 is touched with the small tube portion side surface 21, detachment of the welded portion does not easily occur. Particularly, compared with simply welding the connection hole peripheral edge at the small tube portion side surface, in the vehicle bumper assembly of this example, detachment does not occur under low loads, and the absorption of impacts by utilizing plastic deformation of the support bracket 1 can be reliably achieved.

The support bracket 1 is indirectly connected with the vehicle body member 8 as a result of causing the large tube portion peripheral edge 24 make contact with a connection flat surface 33 of a vehicle body connection member 32 made of a bent plate fixed by bolting with the vehicle body member 8 so as to be welded with the vehicle body connection member 32. The tube portion peripheral edges 20 and 24 at both ends of the support bracket 1 can both make close contact with the corresponding surfaces by utilizing the bumper 7 and the vehicle body member 8, and the bumper connection member 25 and the vehicle body connection member 32 as a separate unit. In addition, it is easy to work with the connection hole 19 and the deformed-tube receiving hole 23, etc. when using the bumper connection member 25 and the vehicle body connection member 32.

The present invention provides a vehicle bumper assembly having features of (1) an ability to absorb impacts effectively, (2) strong connections between a bumper, a support bracket, and a vehicle body member, (3) reliable impact absorption (reliability), (4) space-saving, and (5) a simple configuration. First, (1) an ability to absorb impacts effectively is achieved based on the ability of the support bracket itself having a multi-step structure with contiguous tube portions to absorb impacts effectively. In addition, the vehicle bumper assembly for connecting tube portion peripheral edges to the inner side of the front surface of the bumper in a substantially abutted manner reduces the volume of plastic deformation under low loads to improve impact absorption efficiency. Since fulfillment of this requirement (1) brings about miniaturization and simplifies the entire vehicle bumper assembly, it also results in (4) space-saving and (5) a simple configuration.

(2) High connection strength between the bumper, the support bracket and the vehicle body member is achieved by welding a side surface of one tube portion to a cylindrical wall provided by enclosing a connection hole for connecting to the bumper, and by joining a peripheral edge of the other tube portion with a support surface of an annular ridge for connecting to the vehicle body member. Welding the cylindrical wall at the side surface of the tube portion prevents detachment of the welded joint portion and improves connection strength by having the extended direction of tube portions the same as the standing direction of the cylindrical wall. Furthermore, the welding of the cylindrical wall at the side surface of the tube portion results in simple welding between the cylindrical wall and the side surface of the tube portion. Joining the peripheral edge of the other tube portion with the support surface of the annular ridge prevents plastic deformation of the support bracket from reaching the joint portion and therefore improves connection strength. In both cases, connection strength between the bumper, the support bracket and the vehicle body member is maintained and improved, and (3) reliable impact absorption (reliability) is achieved when plastic deformation is carried out at the time of dynamic impact absorption.

What is claimed is:

1. A vehicle bumper assembly comprising; a bumper; a bumper connection member attached to said bumper; a support bracket attached to said bumper via said bumper connection member, said support bracket being in the form of a molded multi-step tubular structure having a plurality of plastically deformable straight tube portions of different outer diameters contiguous to one another, said tube portions being formed by reducing and enlarging an initially-uniform-diameter blank tube radially at longitudinally spaced local positions; and a vehicle body member connected to said support bracket via a vehicle body connection member; wherein one end tube portion of said support bracket being connected to said bumper via said bumper connection member, and the other end tube portion of said support bracket being connected to said vehicle body member via said vehicle body connection member; said bumper connection member being installed to one end or one end portion of said bumper by welding; said bumper connection member having a connection hole on the surface thereof opening toward the direction to said vehicle body member; said one end tube portion of said support bracket being inserted into said connection hole of said bumper connection member and having a side surface welded to a peripheral edge of said connection hole; and said vehicle body connection member has an annular ridge pressed against and welded to an end edge of said one end tube portion of said support bracket, said annular ridge having a support surface defined between an outer peripheral wall wider than the outer diameter of said one end tube portion and an inner peripheral wall narrower than the inner diameter of said tube contiguous to said one end tube portion, said vehicle body connection member also having, in said support surface on a side toward said inner peripheral wall, a deformed-tube receiving hole.

2. The vehicle bumper assembly according to claim 1, wherein said bumper has at a position toward the one end and in a surface facing said vehicle body member a cutaway, and said bumper connection member is attached to said cutaway of said bumper.

3. The vehicle bumper assembly according to claim 1, wherein said bumper connection member has a cylindrical wall projecting from said peripheral edge of said connection hole and touching said side surface of said one end tube portion, said cylindrical wall having a peripheral edge welded to said side surface of said one end tube portion.

* * * * *